(12) United States Patent
Daily et al.

(10) Patent No.: US 7,557,736 B1
(45) Date of Patent: Jul. 7, 2009

(54) HANDHELD VIRTUAL OVERLAY SYSTEM

(75) Inventors: Michael J. Daily, Thousand Oaks, CA (US); Jerry Isdale, Thousand Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 412 days.

(21) Appl. No.: 11/217,214

(22) Filed: Aug. 31, 2005

(51) Int. Cl.
*G08G 1/123* (2006.01)

(52) U.S. Cl. .............................. 340/995.1; 342/357.04; 701/207; 340/995.12

(58) Field of Classification Search ...... 340/995.1–996, 340/990; 342/357.07, 357.13; 705/10; 701/201, 701/202, 207, 211, 213, 208; 202/158; 382/276
See application file for complete search history.

(56) References Cited

U.S. PATENT DOCUMENTS

| | | | |
|---|---|---|---|
| 6,356,905 B1 * | 3/2002 | Gershman et al. ............. 707/10 |
| 6,401,085 B1 * | 6/2002 | Gershman et al. ............. 707/4 |
| 6,694,253 B2 * | 2/2004 | Schroeder ..................... 71/208 |
| 6,748,323 B2 * | 6/2004 | Lokshin et al. ............. 701/213 |
| 6,765,567 B1 * | 7/2004 | Roberson et al. ............. 345/419 |
| 6,871,143 B2 * | 3/2005 | Fujiwara ..................... 701/211 |
| 7,031,728 B2 * | 4/2006 | Beyer, Jr. .................. 455/456.3 |
| 2003/0080958 A1 * | 5/2003 | Matsumoto et al. ......... 345/421 |
| 2003/0122708 A1 * | 7/2003 | Percy et al. ............. 342/357.07 |
| 2003/0156046 A1 * | 8/2003 | Dwyer et al. ................ 340/973 |
| 2004/0027258 A1 * | 2/2004 | Pechatnikov et al. ...... 340/995.1 |
| 2004/0249565 A1 * | 12/2004 | Park ........................... 701/200 |
| 2005/0035883 A1 * | 2/2005 | Kameda et al. ........... 340/995.1 |
| 2005/0270311 A1 * | 12/2005 | Rasmussen et al. ......... 345/677 |
| 2006/0074549 A1 * | 4/2006 | Takahashi et al. ........... 701/207 |
| 2007/0001874 A1 * | 1/2007 | Feyereisen et al. ....... 340/995.1 |

OTHER PUBLICATIONS

D. Koller, P. Lindstrom, W. Ribarsky, L. Hodges, N. Faust, and G. Turner, "Virtual gis: a real time 3d geographic information system," Proceedings of IEEE Visualization, pp. 94-100, 1995.

* cited by examiner

*Primary Examiner*—Davetta W Goins
*Assistant Examiner*—Hoi C Lau
(74) *Attorney, Agent, or Firm*—Tope-McKay & Associates

(57) ABSTRACT

A handheld virtual overlay system (HVOS) device is presented that includes a global positioning system (GPS) receiver for detecting a global position of the HVOS device; a compass/tilt sensor for detecting a direction and tilt of the HVOS device; a communication module for transmitting the global position, the direction, and the tilt to a data store; and an input/output display configured to receive and display a rendered image. The data store is configured to receive the global position, the direction, and the tilt, and to generate geo-coded data for transmission to a server, where the server is configured to receive the geo-coded data and to transform and render the geo-coded data into a rendered image. A user can point the HVOS device at a scene, with the HVOS device producing a rendered image representing the scene.

40 Claims, 8 Drawing Sheets

| Profile | Viewpoint Control | Realism | Overlay |
|---|---|---|---|
| Tourist | Egocentric | Photorealistic | Points of Interest |
| Police/Fire | Plan | Line | Terrain/Urban |
| Geography | Exocentric | Graphical | Terrain |
| History | Egocentric | Photorealistic | Points of Interest |
| Cultural | Egocentric | Graphical | Points of Interest |

FIG. 3B

HANDHELD VIRTUAL OVERLAY SYSTEM

FIELD OF INVENTION

The present invention relates to a handheld virtual overlay system, and more particularly, to a system that allows a user to point a handheld device at a scene, with the handheld device thereafter producing a rendered image representing the scene.

BACKGROUND OF INVENTION

Currently, there are desktop or lab systems that can render three-dimensional (3D) perspective views of terrain with overlays, and there are portable location-based information services that can provide two-dimensional (2D) and 3D information (e.g., maps) based on global positioning system (GPS) position using local data sources. However, there are no instances of portable systems utilizing server-based rendering with geographic information system (GIS) overlay capability.

PDA/Notebooks with GPS

Several handheld GPS companies are offering tools and software that can generate map images based on a user's current GPS position. For example, the Delorme Earthmate GPS connected to a handheld device running 3D TopoQuad, allows a user to generate 3D perspective views of topographic maps. Additionally, Delorme's XMAP 4.0 software can display in 2D or 3D; with or without shaded relief, contour lines, mad data, and almost any underlying map attributes. The XMAP 4.0 software allows a user to quickly compare aerial or satellite imagery with topographic quad maps or vector maps using a split-screen viewing option. The Delorme Earthmate GPS, 3D TopoQuads, and Delorme XMAP 4.0 software are produced by Delorme, located at Two DeLorme Drive, P.O. Box 298, Yarmouth, Me., 04096, United States of America. Although the Delorme products are considered prior art, they do not enable orientation-specific rendered views, do not address user selection of overlays, and require that all geographic information system (GIS) resources be stored on a unit in advance.

Other systems with similar deficiencies include the Garmin iQue 3600 which uses maps on a personal digital assistant (PDA) integrated with GPS position (i.e., navigation). The Garmin iQue 3600 is produced by Garmin International Inc., located at 1200 East 151st Street, Olathe, Kans., 66062, United States of America.

MapTech's Terrain Navigation family of products are also similar, with products running on notebook computers and PDAs that are coupled with GPS receivers. The MapTech products are produced by MapTech, Inc., located at 10 industrial Way, Amesbury, Mass., 01913, United States of America. These products also require local map databases and rendering. The notebook-based products can provide 3D renderings.

GIS Database & Rendering

The leader in GIS software and databases, ESRI, located at 380 New York Street, Redlands, Calif., 92373-8101, United States of America, markets ArcPAD as a solution for desktop and laptop systems, but does not enable 3D rendered views on the spot with overlays. The ArcGIS 3D Analyst product is an add-on to the ArcGIS desktop application that provides 3D renderings with overlays, but only on the local desktop computer. ArcIMS, ArcWeb and ArcObject are ESRI tools for providing GIS services via the Internet, but they do not include 3D rendering.

Erdas Imagine software plus virtual GIS can do 3D rendering of imagery or topographic maps, with icon overlays from ESRI DB. The Erdas Imagine product is produced by Leica Geosystems GIS & Mapping, LLC, located at 2801 Buford Highway, New England, Atlanta, Ga., 30329-2137, United States of America. It is a desktop product requiring significant processing power and access to the GIS database. It can produce animated movies for distribution over the internet, but not interactively generate them based on client GPS/orientation.

Web 3D Rendering

Keyhole Corp. has a 3D viewer/server system, but does not use orientation in its renderings. Keyhole Corp. is located at 1101 L'Avenida, Mountain View, Calif., 94043, United States of America. The Keyhole system uses a client's desktop system for rendering.

Infmedia's 3DIMap technology creates 3D renderings from GIS data sources using server-based GIS and rendering software. Infmedia is located at 56010 Ghezzano (PI), Via Carducci 64/D, Italy. The Infmedia product does not utilize GPS and orientation hardware on the client system. Although GIS data is included in their technical diagrams, no examples are provided showing the use of overlays. The system is intended for the production of canned 3D experiences and does not provide for real-time mapping.

A variety of other commercial terrain databases exist for rendering 3D views of terrain. For example, Digimation, located at 101 James Drive, Suite 150, St. Rose, La., 70087, United States of America, provides the 3D U.S.A. models of the mainland U.S. However, they do not contemplate the means to use these databases.

In academia, several systems have been developed to enable a portable virtual GIS. Foremost is the work from Georgia Tech, located at Georgia Institute of Technology, Atlanta, Ga., 30332, United States of America. See, (http://www.cc.gatech.edu/gvu/datavis/research/vgis.html, D. Koller, P. Lindstrom, W. Ribarsky, L. Hodges, N. Faust, and G. Turner. Virtual GIS: A real time 3D geographic information system. Proceedings of IEEE Visualization, pages 94-101, 1995.) The TellMaris project in the European Union has implemented test applications of a portable GIS using notebook or kiosk systems to provide 3D renderings. The TellMaris system uses local rendering hardware with access to Internet-based map products.

A number of Augmented Reality (AR) systems have been developed in academia. These systems place labels and other annotations over live images and display the results through a Head Mounted Display. The data and rendering is done locally on a notebook computer. Label deconfliction is provided by sophisticated placement algorithms. Example AR systems are Columbia University's MARS and HRL Laboratories DVEB systems. Columbia University's MARS program is located at Columbia University, Department of Computer Science, 450 Computer Science Building, 1214 Amsterdam Avenue, Mailcode: 0401, New York, N.Y., 10127-7003, United States of America. HRL Laboratories is located at 3011 Malibu Canyon Road, Malibu, Calif., 90265, United States of America.

Web-Based Servers

The Open GIS Consortium, Inc. (OGC), located at 35 Main Street, Suite 5, Wayland, Mass., 01778-5037, United States of America, has defined a number of standard protocols for GIS Web Services and sponsored development of reference implementations. These standards and implementations could be used as backend data sources for the Invention, but they do not provide for 3D rendering. OGC standards include: Catalog Interface, Coordinate Transformation Services, Filter Encodings, Geographic Markup Language Grid coverages Simple Features, Styled Layer Descriptor, Web Coverage Service, Web Feature Service, Web Map Context Documents, and Web Map Service.

Prior art is either overly constrained by the limitations of current hardware, or overly complex in its attempt to solve an academic problem. In addition, prior handheld systems do not use orientation sensing, which is a key aspect needed to automatically generate a user's requested view. Furthermore, there are no instances of portable systems utilizing server based rendering with GIS overlay capability. Thus, a continuing need exists for portable, handheld device that has the ability to display 3D-rendered imagery based on a user's location and orientation.

SUMMARY OF INVENTION

The present invention relates to a handheld virtual overlay system (HVOS) device. The HVOS device comprises a global positioning system (GPS) receiver for detecting a global position of the HVOS device; a compass for detecting a direction of the HVOS device; a communication module for transmitting the global position and the direction to a data store, the data store configured to receive the global position and the direction, and to generate geo-coded data for transmission to a server, the server configured to receive the geo-coded data and to transform and render the geo-coded data into a rendered image representing the global position and direction of the HVOS device; and a display configured to receive and display the rendered image, whereby a user can point the HVOS device at a scene, and the HVOS device produces a rendered image representing the scene.

In another aspect, the HVOS device further comprises a tilt sensor for detecting a tilt of the HVOS device, such that the data store is configured receive the global position, the direction, and the title, and to generate geo-coded data for transmission to a server, the server configured to receive the geo-coded data and to transform and render the geo-coded data into a rendered image representing the global position, direction, and tilt of the HVOS device.

In yet another aspect, the HVOS system further comprises a data store communicatively connected with the communication module. The data store comprises GIS data, geo-referenced images, and geo-referenced elevation information.

Additionally, the HVOS further comprises a server communicatively connected with the data store. The server comprises a geo-coding transformation engine and a three-dimensional (3D) renderer for rendering a rendered image.

In yet another aspect, the communication module is a wireless communication module.

Furthermore, the display includes an output mode for viewing the rendered image, and an input mode for interacting with the rendered image.

In another aspect, the display is configured to view imagery while the handheld device is pointed at the imagery, and further includes a compass icon communicatively connected with the compass/tilt sensor. The compass icon illustrates a directional relationship of the handheld device with the rendered image.

In yet another aspect, the HVOS further comprises an output audio description of overlay data in connection with the compass.

Additionally, the HVOS further comprises a control module with at least three adjusters for adjusting the rendered image. A first adjuster is an overlay content adjuster; a second adjuster is a viewpoint (frame of reference) adjuster; and a third adjuster is a realism adjuster.

In another aspect, the HVOS further comprises a selection module communicatively connected with the display. The selection module is configured to enable the system to receive and store personal preferences for each user. The selection module is further configured to cluster requests from multiple users. Additionally, the selection module includes at least one pre-constructed profile, enabling a user to select a pre-constructed profile and thereby request default display parameters corresponding to the pre-constructed profile. The at least one pre-constructed profile is a profile selected from a group consisting of tourist, fire, police, geography, history, and cultural.

Finally, as can be appreciated by one in the art, the present invention also comprises a method and computer program product for performing the operations (i.e., rendering an image representing a global position) of the invention described herein. Additionally, the present invention also comprises a method for forming a HVOS system described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3B is a table illustrating exemplary default parameter settings for selected default profiles;

DETAILED DESCRIPTION

Figure 1:
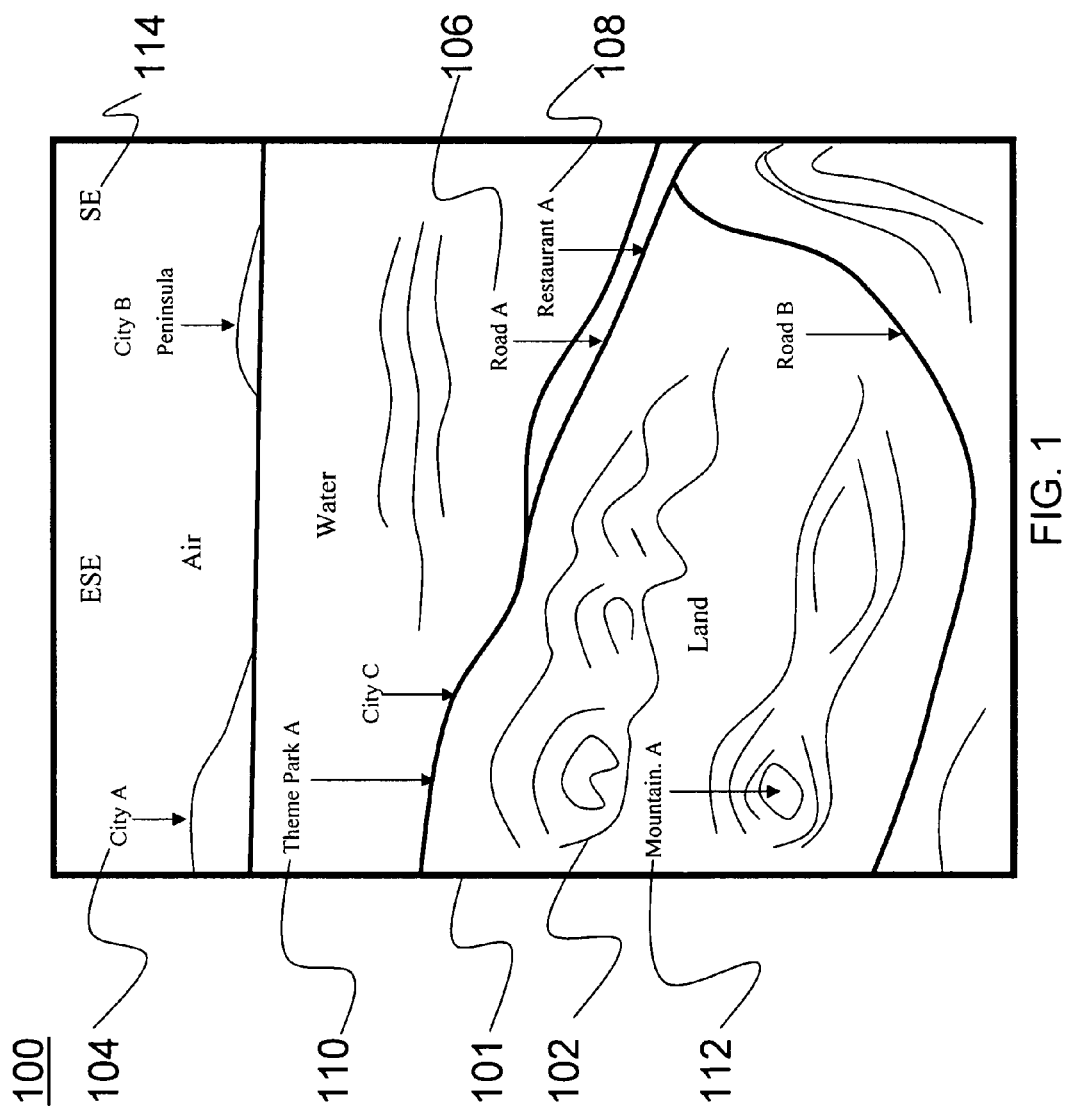
FIG. 1 is an illustration of a rendered image, showing maximum photorealism with a textured three-dimensional (3D) view with elevation for points of interest and key roads as well as compass directions.

The present invention relates to a handheld virtual overlay system, and more particularly, to a handheld virtual overlay system that allows a user to point a handheld device at a scene, with the handheld device thereafter producing a rendered image representing the scene.

The following description, taken in conjunction with the referenced drawings and/or tables, is presented to enable one of ordinary skill in the art to make and use the invention. Various modifications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated qualitatively and without any specific scale, and are intended to generally present the concept of the present invention.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is given as a central resource for the reader. Next, a description of various principal aspects of the present invention is provided. Third, an introduction is provided to provide the reader with a general understanding of the present invention. Fourth, a description of various aspects of the present invention is provided to give an understanding of the specific details. Finally, a conclusion is provided to summarize the concepts presented herein.

(1) GLOSSARY

Before describing the specific details of the present invention, a glossary is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Communicatively Connected—The term "communicatively connected" as used with respect to this invention generally refers to a connection between two components (e.g., between the server and the data store) such that information can be transmitted from one component to the other, non-limiting examples of which include being wired or wirelessly connected.

Geo-Referenced—The term "geo-referenced" as used with respect to this invention generally refers to a form of data or information that is referenced with a certain geographic location and/or direction, a non-limiting example of which includes a geo-referenced image that includes geographic and/or directional position data, such that a query of a particular geographic location and direction will retrieve a geo-referenced image that corresponds to the particular geographic location and direction.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a computer-readable medium such as a floppy disk, a CD-ROM, and a flash drive.

Three-dimensional (3D) renderer—The term "3D renderer" refers to an add-in module that is configured enhance the realism of an image. For example, the 3D renderer is composed of at least two modules: a terrain rendering module, and a 3D overlay module.

(2) PRINCIPAL ASPECTS

The present invention has three "principal" aspects. The first is a handheld virtual overlay system (HVOS). The HVOS is typically in the form of a computer system operating software or in the form of a "hard-coded" instruction set, in conjunction with a hand held device. This system may be incorporated into a wide variety of devices that provide the functionality described herein. The second principal aspect is a method, typically in the form of software, operated using a data processing system (computer). The third principal aspect is a computer program product. The computer program product generally represents computer-readable code stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

(3) INTRODUCTION

The present invention is a handheld virtual overlay system (HVOS). The system supports the rendering of annotated virtual, three-dimensional (3D) perspective views of a user's surroundings, with a focus on providing the simplest possible user interface on a system with low processing power. The system is novel in its use of distributed resources, selection of overlay information, the architecture to enable ease of use, and capabilities it enables. Ease of use at the end-user is accomplished on a handheld device, such as a personal digital assistant (PDA) (or cell phone) equipped with a global positioning system (GPS) and a compass. A user presses a button to render a 3D perspective image with annotations of the surroundings (a virtual "snapshot"). Essentially, generating an image is as simple as pointing the handheld and clicking a button (e.g., "render" button), identical to the way people use cameras. Functionally, this image may be photorealistic, non-photorealistic, have masked regions, or represent occluded objects.

HVOS is a distributed system that takes advantage of geographic information system (GIS) resources (e.g., GIS data, geo-imagery, structure and elevation data), such as those that are available through the World Wide Web. The system knows how to translate and transform from multiple types of data into its form for rendering. It also consists of a rendering server that supplies end-users with 3D perspective views through a wireless communications link. Remote use of resources and rendering reduce the requirements on end-users to know about or purchase data or carry a high-powered computing device, increasing ease of use and reducing cost. GIS resources and rendering may also be co-located with other elements of the system. HVOS provides three modes of selection of overlay information with emphasis on reducing the complexity for the end user: a short list of available profiles, learning of desirable overlay information from users, and an authoring mode for use at the system server.

(4) DETAILED DESCRIPTION

Figure 2:
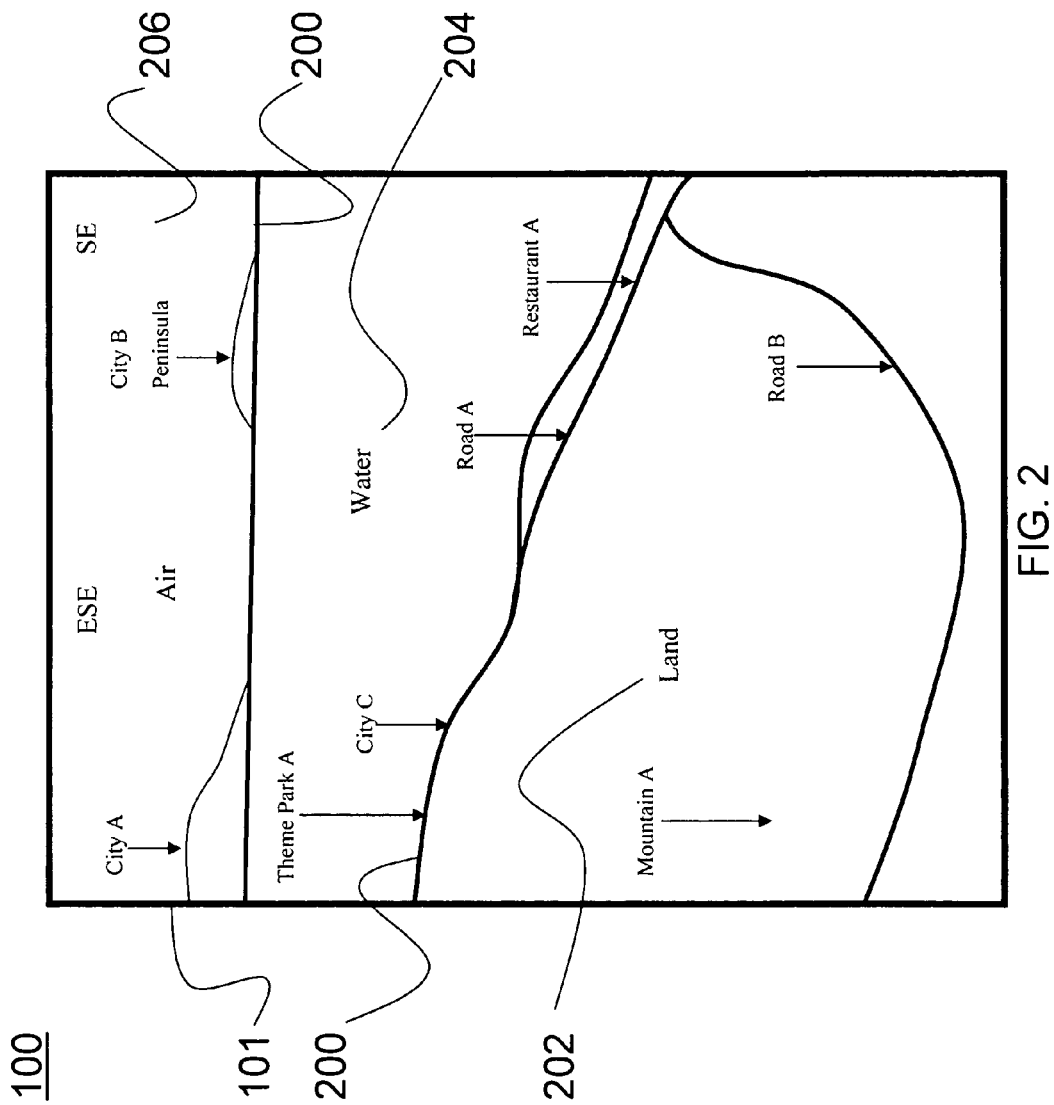
FIG. 2 is an illustration of a rendered image, showing photorealism set to display land, water, and air as annotated lines, with the same features as shown in FIG. 1.

Handheld virtual overlay system (HVOS) is a distributed architecture for rendering three-dimensional (3D) perspective views of digital terrain with a variety of overlays. There are several possible embodiments where resources and computing are distributed in different ways, yet enable the same functionality. FIGS. 1 and 2 show two concept images of the kinds of terrain renderings and overlays that the HVOS 100 can perform, which range from simple annotated horizon lines to complex textured overlays. As shown in FIG. 1, the HVOS display 101 (i.e., visual display) is configured to receive and show maximum photorealism with textured three-dimensional (3D) overlays, with contour lines 102 to aid a user in identifying the scene as relevant to their surroundings. The overlays also include points of interest. The points of interest can be anything that has a geographic location and that may be of interest to a user, non-limiting examples of which include cities 104, roads 106, restaurants 108, theme parks 110 and mountain peaks 112. To aid a user in knowing the user's direction, a compass is included with directional markers 114. The directional markers 114 are any markers that are indicative of a directional pointing of the HVOS 100, non-limiting examples of which include latitude and longitude markings and the full spectrum of the "North, East, South, and West" markings. FIG. 2 is an HVOS display 101 with simple annotated horizon lines 200, showing the points of interest of FIG. 1. In some circumstances, it may be desirable to remove any textured overlay and simply view the scene with horizon lines 200. The horizon lines 200 allow a user to easily distinguish between land, water, and air. In addition to the horizon lines 200, the display 101 includes colors to identify land, water, and air. As a non-limiting example, the land portion 202 on the display 101 may be colored tan, the water portion 204 on the display 101 may be colored dark blue, and the air portion 206 on the display 101 may be colored light blue.

The display 101 includes both an output mode and an input mode. The output mode provides a visual display as described above, where user may easily view various aspects of the present scene. The input mode allows a user to input commands into the HVOS display 101 to interact with and control the rendered image shown in the display 101. As discussed below, a touch screen may be included to operate as the input mode.

Figure 3A:
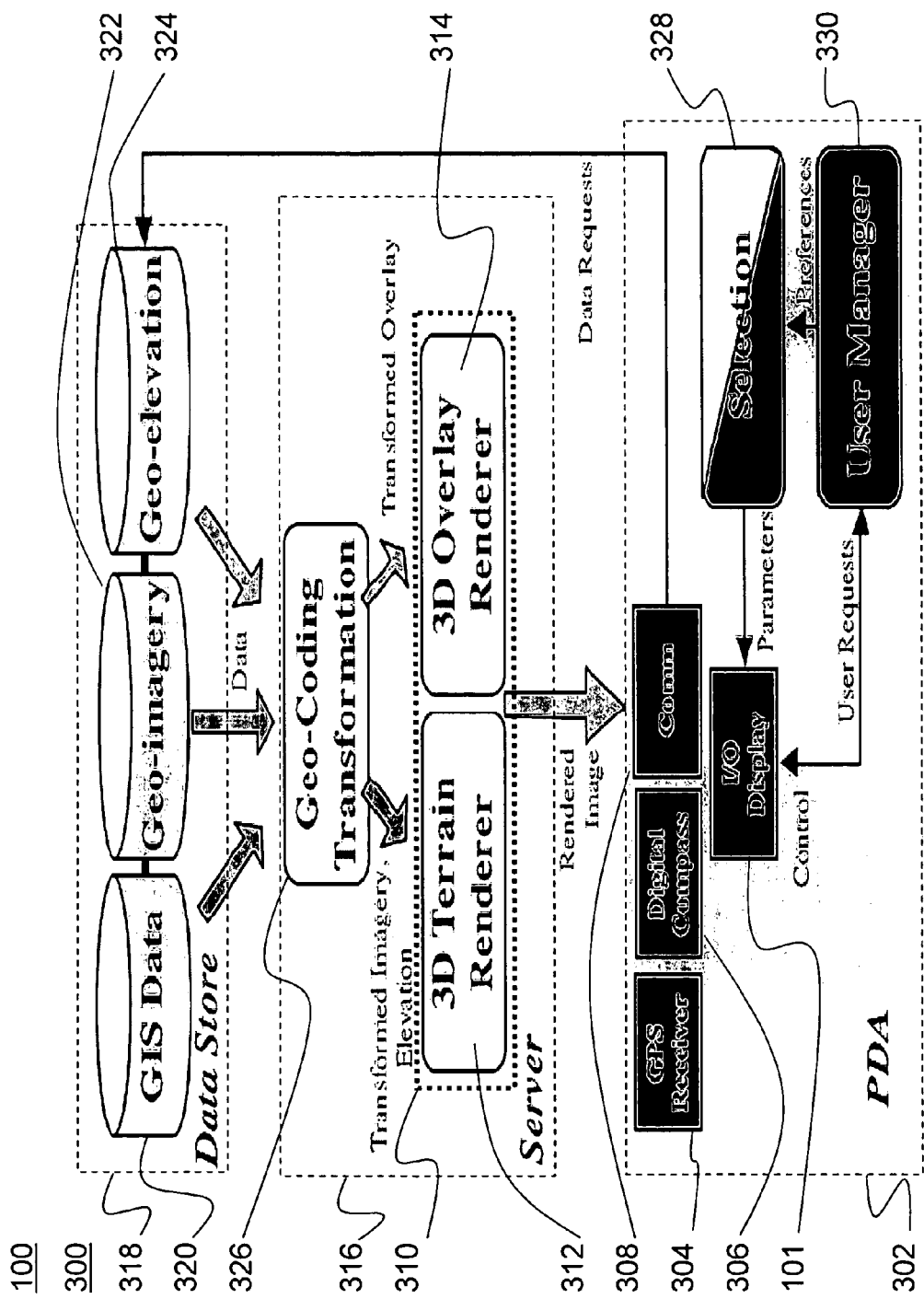
FIG. 3A is a flow chart illustrating handheld virtual overlay system (HVOS) architecture according to the present invention.

FIG. 3A shows the system architecture 300 of the present invention. Variations on this embodiment for the distribution of resources and computing are described in further detail below. The present invention achieves the overarching and primary goal of being simple to use by flowing requirements from the user interface to the rest of the system, and forcing functionality to reside in the system in order to avoid complexity in the interface. The handheld unit hardware consists of a standard personal digital assistant (PDA) 302 with a display 101, such as an extended graphics array (XGA) resolution liquid crystal display (LCD). The PDA 302 also includes a global positioning system (GPS) receiver 304, a digital compass/tilt sensor 306, and a communication module 308. As appreciated by one in the art, the GPS receiver 304 is any suitable mechanism or device for determining a global position of the device. The communication module 308 allows various components of the HVOS system 100 to communicate with each other, such as by transmitting information received from the GPS receiver 304 and the compass/tilt sensor 306 to a data store. In some aspects, the communication module 308 is a wireless communication module, allowing components of the system to be stored and operated remotely, and connected through common wireless connection techniques.

A thee-dimensional (3D) renderer 310 is included to enhance the realism of the image. The 3D renderer 310 is any add-in that can enhance the realism of an image. For example, the 3D renderer 310 is composed of at least two modules: a terrain rendering module 312, and a 3D overlay module 314. This functionality uses a z buffer to mask data and determine occlusion. Terrain rendering is a special sub-discipline of 3D graphics. A variety of techniques are used to handle the large geometric and texture datasets required. The present invention can utilize any of these techniques. Rendering of overlay data (GIS Features) can be done either as objects within the 3D world or as a 2D overlay. 3D rendering places an icon or text object in the 3D rendering, often using special code to insure it is always oriented towards the viewer. This technique easily handles the occlusion of features by terrain, however it does not readily address readability. 2D overlays require determining the location of the 3D feature within the rendered 2D image and placing a label (with connection line) appropriately. Occlusion of features by terrain, if desired, can be obtained by inserting invisible objects within the 3D rendering and testing their visibility from the camera. However, sometimes it may be desirable to provide labels for occluded objects. An overlay rendering may be represented as a transparent 2D picture, or it may be a list of labels with their text and locations within the image space. The latter technique allows rendering on the client device to easily adapt to device particularities and user preferences (such as a different type face). A single terrain rendering can be utilized with several 2D overlays. The user can optionally select to include or exclude overlays in the delivered image. The compositing of overlays and renderings can be done either on a remote server 316 or at the client device 302 (e.g., PDA).

The data store 318 consists of GIS data 320, geo-referenced images 322, and geo-referenced elevation information 324. The data store 318 receives the global position and direction of the HVOS device to generate geo-coded data that is provided to the server 316. The geo-coded data includes the specific information from the data store 318 (as identified above) that pertains to the relative global position and direction of the HVOS device. The server 316 operates as a rendering server to receive the geo-coded data and to transform and render the geo-coded data into a rendered image representing the global position and direction of the HOVS device. The server 316 includes a geo-coding transformation engine 326 and the three-dimensional (3D) renderer 310. The server 316 is a computer system that is preferably operated remotely. However, in some circumstances it may be desirable 316 to include the server 316 within the client device 302.

GIS data 320, often called "features", may include geometric entities such as points, lines, areas, and 3D objects (buildings) as well as textual information such as place names, ownership, and other data about the feature. Geo-referenced images 322 are images gathered from satellites, aircraft and other sources and processed so that their extents are specified by some form of geo-location. Imagery may also be in the form of topographical and other 2D maps. The geo-referenced elevation information 324 is usually stored in the form of a height field; a series of measurements evenly spaced on a curved earth. A data store 318, especially one with images, contains many terabytes. As such, the information in the present invention may be stored on the handheld device 302, or may be stored in a distributed fashion throughout the web. By employing a geo-coding transformation engine (TE) 326 between the 3D renderer 310 and data store 318, HVOS can use whatever resources are available through the web. Example data sites are the California Spatial Information Library (CSIL: http://gis.ca.gov/) and the US Census 2000 TIGER/Line data (http://www.census.gov/geo/www/tiger/tigerua/ua_tgr2k.html). The OpenGIS Consortium (OGC) has defined a series of standards for providing GIS data (including imagery and elevation) via web services. The OGC has also defined a standard for Coordinate Conversion Services which provide interfaces for general positioning, coordinate systems and coordinate transformations. The geo-coding TE 326 can be an implementation of these standards to retrieve and provide the relevant geo-referenced data.

The HVOS 100 may also include a selection module 328 communicatively connected with the display 101. The selection module 328 simplifies the selection of parameters for the rendering and enables the system to learn personal preferences for each user, and to cluster requests from multiple users. Within the selection module 328, several pre-constructed profiles enable users to request information without setting any parameters. The profiles are constructed using an authoring mode and include classes, non-limiting examples of which include tourist, fire, police, geography, history, and cultural. When selecting a pre-constructed profile, initial defaults settings are provided. FIG. 3B includes a table illustrating exemplary default parameter settings for selected default profiles. Although the default parameter settings can be determined for a larger number of profiles based on user feedback, the default parameter settings generally serve as a starting point for a novice user to get acquainted with the functionality of the HVOS.

Additional pre-stored profiles are possible, but since a system goal is to eliminate complexity from the users' requests, when the selection module 328 is located at the rendering server, the requests of multiple users are modeled for each location to determine the most likely forms of overlays, viewpoints, and realism. A standard k-means clustering approach in three dimensions is used to compute the seven most likely profiles for each location.

Locations are modeled by clustering orientations from the requests into one of eight orientation bins (i.e., 45° fields of view) and positions within a threshold distance (cluster tightness). In the case where the selection module 328 is contained local to the handheld unit 302 (possibly for privacy reasons so no preference information is stored at the server 316), the system employs a simple learning update rule to reinforce the parameters that the user selects, both dependent on location and without concern for location. In this way, HVOS 100 can learn, for example, that an individual always requests the egocentric view, points of interest overlay, and medium realism regardless of location.

Figure 4:
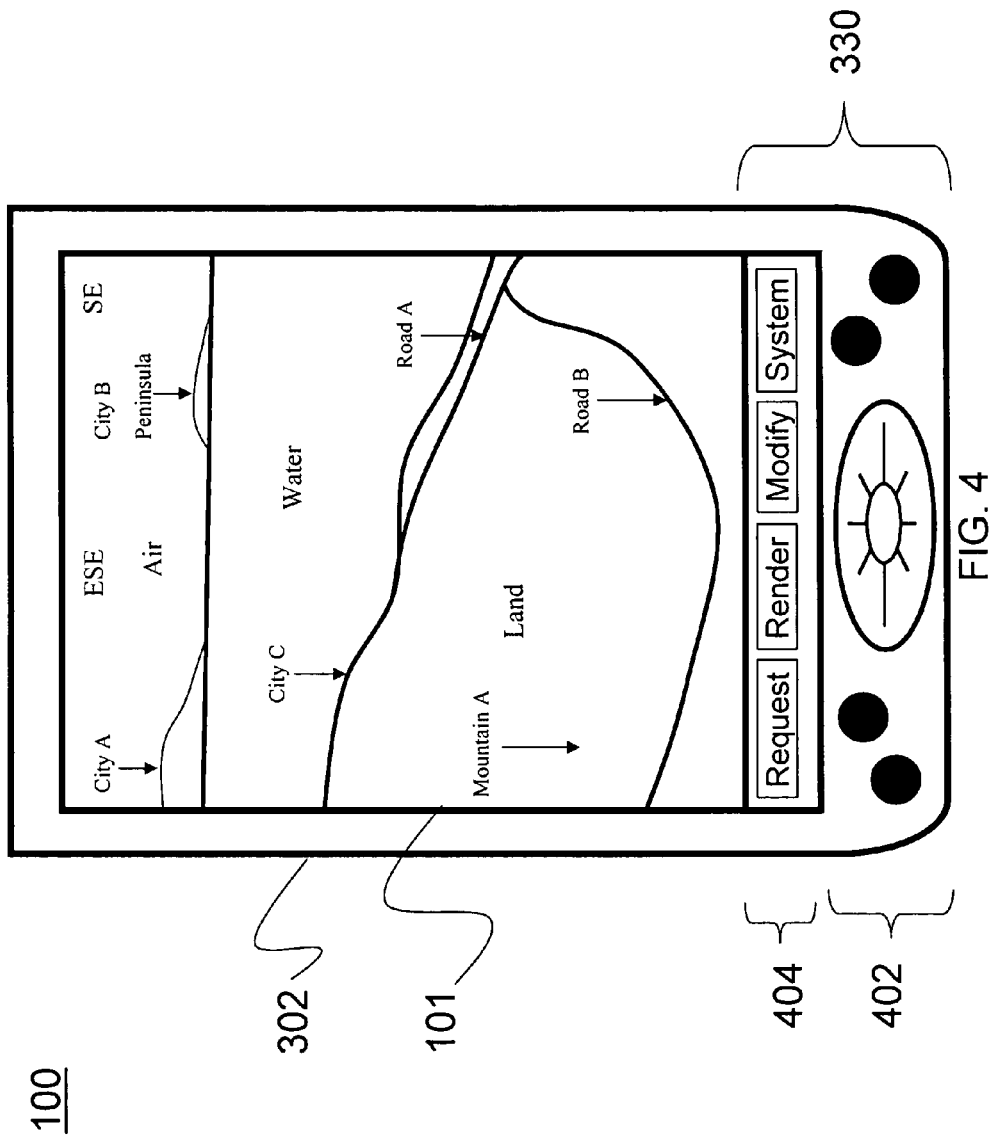
FIG. 4 is an illustration of an HVOS with a mockup rendered image.

The user interface 330 functionality is constrained to function at the handheld unit 302. As shown in FIG. 4, the HVOS system 100 is incorporated into a handheld device 302. The HVOS handheld device 302 includes the HVOS display 101 and the user interface 330. As non-limiting examples, the user interface 330 can be in the form of manual buttons and controls 402, and touch sensitive controls 404 on the HVOS display 101 itself (i.e., a touch screen). The rest of the system may be located remotely, or alternatively reside on the handheld 302 if sufficient processing and storage exist. Below is a description of two variations on the present invention that group the architecture resources and computing differently.

PDA Only Embodiment

In this version, all resources and computation are local on the PDA. This requires computation and storage that are currently beyond what is commercially available, but will likely be possible in the near future. Making HVOS a completely self-contained unit eliminates the need for a communications link, except for access to real-time dynamic datasets. It also prevents the system from using multiple users' preferences to learn the best overlay data for a given location.

PDA with Rendering

In this embodiment, the 3D rendering services reside on the PDA, and all data sets are remote. This requires higher bandwidth communications to the PDA in order to send the raw datasets to the PDA for rendering, but once the datasets are local, it enables a variety of user interactions within the "modify" function.

Figure 5:
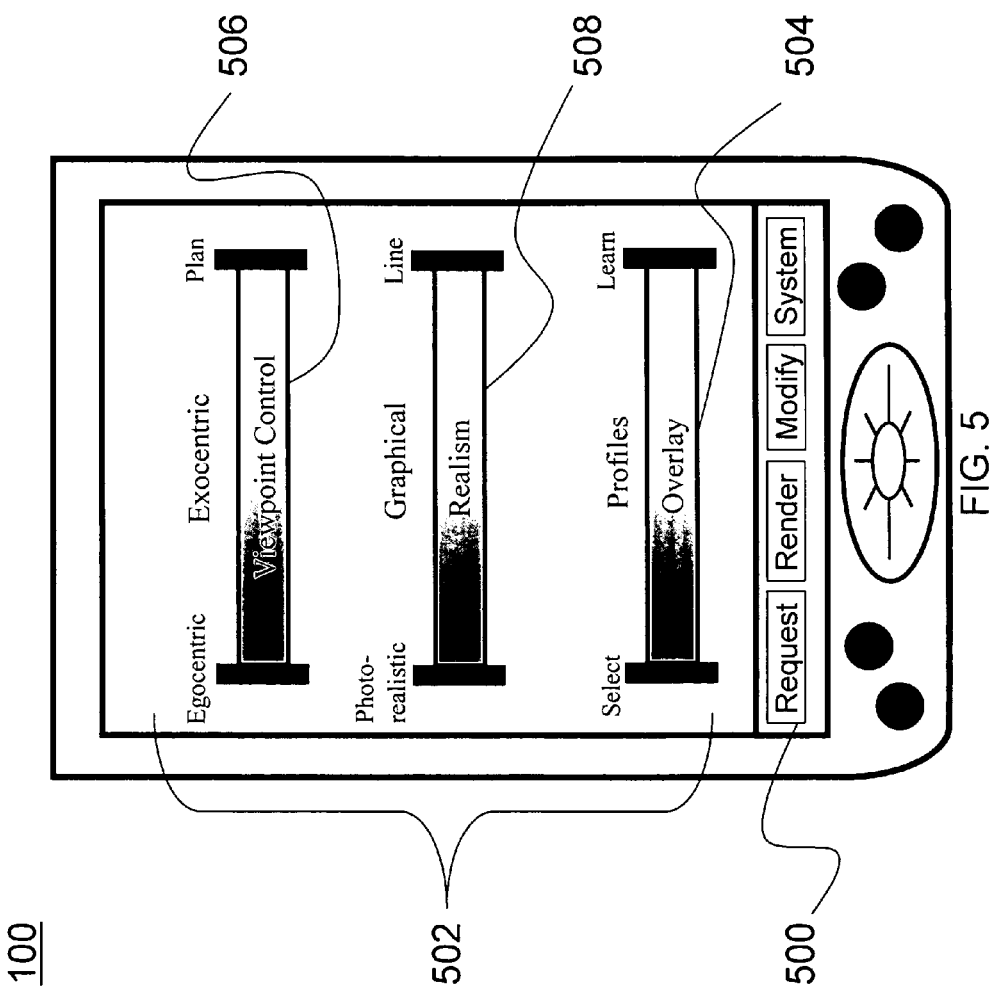
FIG. 5 is an illustration of an HVOS showing three slider bars according to the present invention.

As shown in FIG. 5, the user's possible rendering request 500 is constrained along any number of suitable dimensions with a control module 502. For example, using the control module 502, the rendering request 500 can be constrained along three dimensions which the user may select using three adjusters (e.g., slider bars) to define a preference and modify the rendered image. Although one in the art can appreciate that other dimensions may be used, the three dimensions illustrated in FIG. 5 are overlay content which is adjusted using an overlay content adjuster 504, viewpoint (i.e., frame of reference) which is adjusted using a viewpoint adjuster 506, and realism which is adjusted using a realism adjuster 508. A selection module is also included for generating requests automatically.

Figure 6:
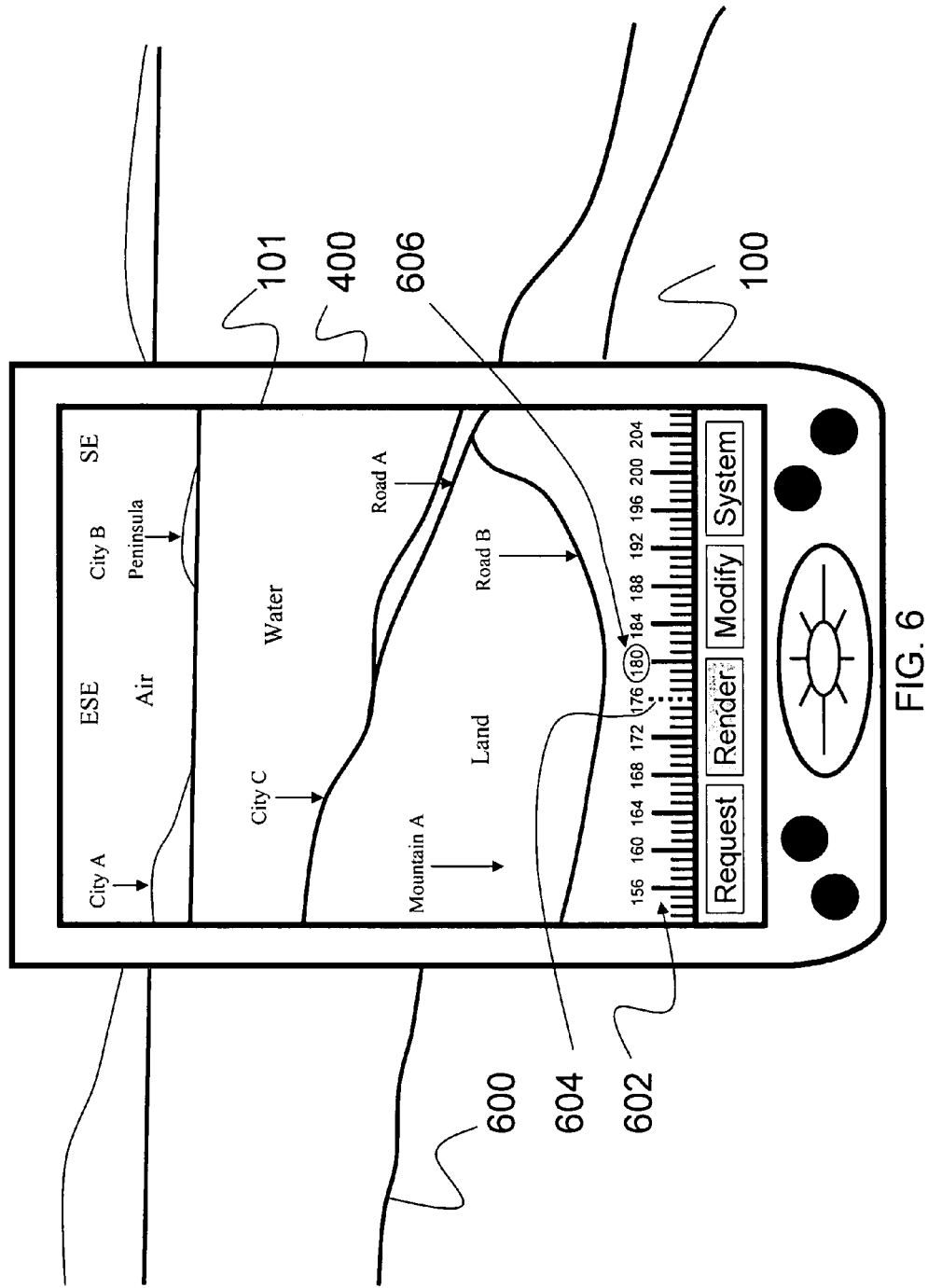
FIG. 6 is an illustration of an HVOS, illustrating a mockup of a modify function showing compass heading and snapshot heading.

In addition to enabling simple user defined requests, the HVOS interface provides a simple output mode for viewing and interacting with the resulting imagery. As shown in FIG. 6, as the user points the handheld device while viewing the imagery 600, a compass icon 602 shows the user when the HVOS device is closely lined up with the rendered image in the HVOS display 101. This can be done through a variety of techniques, a non-limiting example of which includes using a line marker 604 to indicate the compass heading, with an image marker 606 to indicate a snapshot heading. In the present invention, a compass, such as a digital compass, is used for orientation sensing since the present invention does not accurately register a user's view to object in the surrounding environment (as in traditional augmented reality (AR) systems).

The handheld device may also output audio descriptions of the overlay data either in connection with the compass (along a heading), or through designation with the pointer. The audio descriptions enable a user to listen to a description of the present scene.

Figure 7:
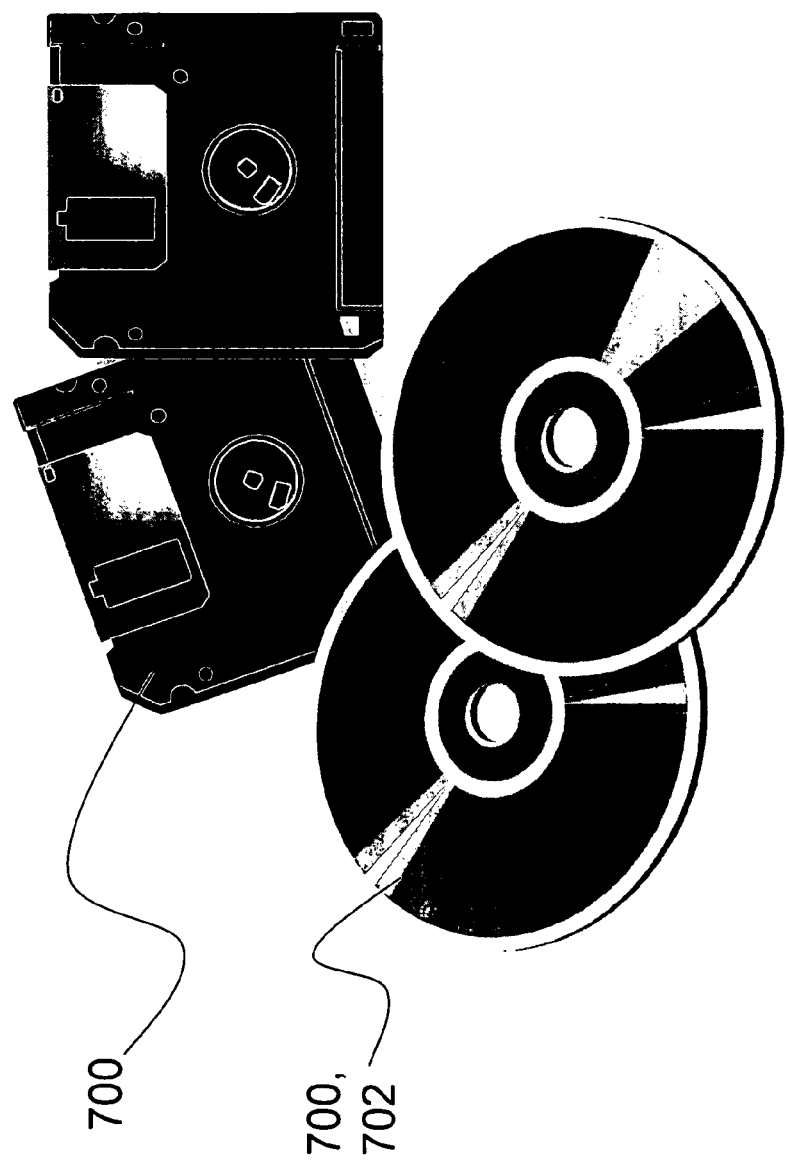
FIG. 7 is an illustrative diagram of a computer program product embodying the present invention.

An illustrative diagram of a computer program product embodying the present invention is depicted in FIG. 7. The computer program product 700 is depicted as an optical disk such as a compact disk (CD) 702 or digital versatile disk (DVD). However, as mentioned previously, the computer program product generally represents computer-readable code stored on any compatible computer-readable medium. The computer program product 700 includes instruction means encoded on a computer-readable medium, for causing the operations of the HVOS system described herein.

(5) CONCLUSION

Although GPS systems exist and PDA systems exist, there are no instances of portable systems utilizing server-based rendering with GIS overlay capability similar to HVOS. The present invention describes an extensible architecture for accomplishing a cost-effective and easy to use handheld system for displaying geographic information to a user. The HVOS system provides the user with improved situation awareness by enabling a rapid and intuitive comparison of the surroundings with the virtual rendered image with overlays. Potential applications include vehicle navigation and commercial travel.

What is claimed is:

1. A handheld virtual overlay system (HVOS) device, comprising:
   a global positioning system (GPS) receiver for determining a global position of the HVOS device;
   a compass for detecting a direction of the HVOS device;
   a communication module for transmitting the global position and the direction to a data store, the data store configured to receive the global position and the direction and to generate geo-coded data for transmission to a server, the server configured to receive the geo-coded data and to transform and render the geo-coded data into an egocentric rendered image representing the global position and orientation of the HVOS device; and
   a display configured to receive and display the egocentric rendered image, whereby as a user points the HVOS device at a scene, the HVOS device produces and displays an egocentric rendered image representing the scene.

2. A handheld virtual overlay system (HVOS) device as set forth in claim 1, further comprising a tilt sensor for detecting a tilt of the HVOS device and configured such that the data store can receive the global position, the direction, and the tilt, and generate geo-coded data for transmission to a server where the server is configured to receive the geo-coded data and to transform and render the geo-coded data into the egocentric rendered image representing the global position, direction, and tilt of the HVOS device.

3. A handheld virtual overlay system (HVOS) device as set forth in claim 1, further comprising a data store communicatively connected with the communication module, the data store comprising geographic information system (GIS) data, geo-referenced images, and geo-referenced elevation information.

4. A handheld virtual overlay system (HVOS) device as set forth in claim 1, further comprising a server communicatively connected with the data store, the server comprising a geo-coding transformation engine and a three-dimensional (3D) renderer for rendering a rendered image.

5. A handheld virtual overlay system (HVOS) device as set forth in claim 1, wherein the communication module is a wireless communication module.

6. A handheld virtual overlay system (HVOS) device as set forth in claim 1, wherein the display includes an output mode for viewing the rendered image, and an input mode for interacting with the rendered image.

7. A handheld virtual overlay system (HVOS) device as set forth in claim 1, wherein the display is configured to display imagery while the handheld device is pointed at the imagery, and further includes a compass icon communicatively connected with the compass, the compass icon illustrating a directional relationship of the handheld device with the rendered image.

8. A handheld virtual overlay system (HVOS) device as set forth in claim 1, further comprising an output audio description of overlay data in connection with the compass.

9. A handheld virtual overlay system (HVOS) device as set forth in claim 1, further comprising a control module with at least three adjusters for adjusting the rendered image, a first adjuster being an overlay content adjuster, a second adjuster being a viewpoint adjuster, and a third adjuster being a realism adjuster.

10. A handheld virtual overlay system (HVOS) device as set forth in claim 1, further comprising a selection module communicatively connected with the display, the selection module configured to enable the system to receive and store personal preferences for each user.

11. A handheld virtual overlay system (HVOS) device as set forth in claim 10, wherein the selection module is further configured to cluster requests from multiple users.

12. A handheld virtual overlay system (HVOS) device as set forth in claim 10, wherein the selection module includes at least one pre-constructed profile, enabling a user to select a pre-constructed profile and thereby request default display parameters corresponding to the pre-constructed profile.

13. A method for rendering an image representing a global position, comprising acts of:
   determining a global position of a handheld virtual overlay system (HVOS) device;
   detecting a direction of the HVOS device using a compass;
   transmitting the global position and the direction to a data store using a communication module, the data store configured to receive the global position and the direction and to generate geo-coded data for transmission to a server, the server configured to receive the geo-coded data and to transform and render the geo-coded data into an egocentric rendered image representing the global position and orientation of the HVOS device; and
   displaying the rendered image on a display, whereby as a user points the HVOS device at a scene, the HVOS device produces and displays an egocentric rendered image representing the scene.

14. A method for rendering an image representing a global position as set forth in claim 13, further comprising an act of detecting a tilt of the HVOS device using a tilt sensor, where the HVOS device is configured such that the data store can receive the global position, the direction, and the tilt, and generate geo-coded data for transmission to a server where the server is configured to receive the geo-coded data and to transform and render the geo-coded data into the egocentric rendered image representing the global position, direction, and tilt of the HVOS device.

15. A method for rendering an image representing a global position as set forth in claim 13, further comprising an act of communicatively connecting a data store with the communication module, the data store comprising geographic information system (GIS) data, geo-referenced images, and geo-referenced elevation information.

16. A method for rendering an image representing a global position as set forth in claim 13, further comprising an act of communicatively connecting a server with the data store, the server comprising a geo-coding transformation engine and a three-dimensional (3D) renderer for rendering a rendered image.

17. A method for rendering an image representing a global position as set forth in claim 13, wherein in the act of transmitting the global position and the direction to a data store using a communication module, the communication module is a wireless communication module.

18. A method for rendering an image representing a global position as set forth in claim 13, wherein in the act of configuring the display, the display includes an output mode for viewing the rendered image, and an input mode for interacting with the rendered image.

19. A method for rendering an image representing a global position as set forth in claim 13, wherein in the act of displaying the rendered image on a display, the display is configured to display imagery while the handheld device is pointed at the imagery, and further includes a compass icon communicatively connected with the compass, the compass icon illustrating a directional relationship of the handheld device with the rendered image.

20. A method for rendering an image representing a global position as set forth in claim 13, further comprising an act of outputting an audio description of overlay data.

21. A method for rendering an image representing a global position as set forth in claim 13, further comprising an act of adjusting the rendered image using a control module having three adjusters, a first adjuster being an overlay content adjuster, a second adjuster being a viewpoint adjuster, and a third adjuster being a realism adjuster.

22. A method for rendering an image representing a global position as set forth in claim 13, further comprising acts of receiving and storing personal preferences for each user using a selection module connected with the display.

23. A method for rendering an image representing a global position as set forth in claim 22, further comprising an act of clustering requests from multiple users through a solution module communicatively connected with the display.

24. A method for rendering an image representing a global position as set forth in claim 22, further comprising an act of using a selection module communicatively connected with the display to select a pre-constructed profile and thereby request default display parameters corresponding to the pre-constructed profile.

25. A computer program product for operating a virtual overlay system (HVOS) device, comprising instruction means encoded on a computer-readable medium, for causing operations of:
   receiving a global position of the HVOS device from a global positioning system (GPS);
   receiving a direction of the HVOS device from a compass;
   using the global position and direction to generate geo-coded data;
   transforming and rendering the geo-coded data into an egocentric rendered image representing the global position and orientation of the HVOS device; and
   displaying the rendered image, whereby as a user points the HVOS device at a scene, the HVOS device produces and displays an egocentric rendered image representing the scene.

26. A computer program product for operating a handheld virtual overlay system (HVOS) device as set forth in claim 25, further comprising instruction means encoded on a computer-readable medium, for detecting a tilt of the HVOS device and configured such that the data store can receive the global position, the direction, and the tilt, and generate geo-coded data for transmission to a server where the server is configured to receive the geo-coded data and to transform and render the geo-coded data into the egocentric rendered image representing the global position, direction, and tilt of the HVOS device.

27. A computer program product for operating a handheld virtual overlay system (HVOS) device as set forth in claim 25, further comprising instruction means encoded on a computer-readable medium, for communicatively connecting a data store with the communication module, the data store comprising geographic information system (GIS) data, geo-referenced images, and geo-referenced elevation information.

28. A computer program product for operating a handheld virtual overlay system (HVOS) device as set forth in claim 25, further comprising instruction means encoded on a computer-readable medium, for communicatively connecting a server with the data store, the server comprising a geo-coding transformation engine and a three-dimensional (3D) renderer for rendering a rendered image.

29. A computer program product for operating a handheld virtual overlay system (HVOS) device as set forth in claim 25, further comprising instruction means encoded on a computer-readable medium, for configuring the display to include an output mode for viewing the rendered image, and an input mode for interacting with the rendered image.

30. A computer program product for operating a handheld virtual overlay system (HVOS) device as set forth in claim 25, further comprising instruction means encoded on a computer-readable medium, for configured the display to display imagery while the handheld device is pointed at the imagery, and further including a compass icon communicatively connected with the compass, the compass icon illustrating a directional relationship of the handheld device with the rendered image.

31. A computer program product for operating a handheld virtual overlay system (HVOS) device as set forth in claim 25, further comprising instruction means encoded on a computer-readable medium, for outputting audio descriptions of overlay data.

32. A computer program product for operating a handheld virtual overlay system (HVOS) device as set forth in claim 25, further comprising instruction means encoded on a computer-readable medium, for adjusting the rendered image using a control module having at least three adjusters, a first adjuster being an overlay content adjuster, a second adjuster being a viewpoint adjuster, and a third adjuster being a realism adjuster.

33. A computer program product for operating a handheld virtual overlay system (HVOS) device as set forth in claim 25, further comprising instruction means encoded on a computer-readable medium, for enabling the HVOS system to receive and store personal preferences for each user using a selection module communicatively connected with the display.

34. A computer program product for operating a handheld virtual overlay system (HVOS) device as set forth in claim 33, further comprising instruction means encoded on a computer-readable medium, for clustering requests from multiple users.

35. A computer program product for operating a handheld virtual overlay system (HVOS) device as set forth in claim 33, further comprising instruction means encoded on a computer-readable medium, for enabling a user to select a pre-constructed profile and thereby request default display parameters corresponding to the pre-constructed profile.

36. A method for forming a handheld virtual overlay system (HVOS) device, comprising acts of:
   configuring a global positioning system (GPS) receiver to determine a global position of the HVOS device;
   configuring a compass for detecting a direction of the HVOS device;
   configuring a communication module to transmit the global position and the direction to a data store, the data store configured to receive the global position and the direction and to generate geo-coded data for transmission to a server, the server configured to receive the geo-coded data and to transform and render the geo-coded data into an egocentric rendered image representing the global position and orientation of the HVOS device; and
   configuring a display to receive and display the rendered image, whereby as a user points the HVOS device at a scene, and the HVOS device produces and displays an egocentric rendered image representing the scene.

37. A handheld virtual overlay system (HVOS) device as set forth in claim 1, wherein the server is further configured to render an egocentric rendered image with an annotated horizon line.

38. A method for rendering an image representing a global position as set forth in claim 13, wherein the server is further configured to render an egocentric rendered image with an annotated horizon line.

39. A computer program product for operating a handheld virtual overlay system (HVOS) device as set forth in claim 25, further comprising instruction means encoded on a computer-readable medium, for rendering an egocentric rendered image with an annotated horizon line.

40. A method for forming a handheld virtual overlay system (HVOS) device as set forth in claim 36, wherein the server is further configured to render an egocentric rendered image with an annotated horizon line.

\* \* \* \* \*